(12) United States Patent
Balzano

(10) Patent No.: US 7,768,146 B2
(45) Date of Patent: Aug. 3, 2010

(54) FLOW GENERATOR FOR USE IN CONNECTION WITH A UTILITY CONDUIT

(76) Inventor: Alfiero Balzano, 11371 Monarch St., Garden Grove, CA (US) 92841

( * ) Notice: Subject to any disclaimer, the term of this patent is extended or adjusted under 35 U.S.C. 154(b) by 223 days.

(21) Appl. No.: 12/077,799

(22) Filed: Mar. 21, 2008

(65) Prior Publication Data

US 2009/0236852 A1 Sep. 24, 2009

(51) Int. Cl.
*F03B 13/00* (2006.01)

(52) U.S. Cl. .......................... 290/54; 290/43

(58) Field of Classification Search .................. None
See application file for complete search history.

(56) References Cited

U.S. PATENT DOCUMENTS

| | | | | |
|---|---|---|---|---|
| 1,010,609 | A * | 12/1911 | Fountain | 405/75 |
| 2,276,714 | A * | 3/1942 | Brown | 415/203 |
| 2,436,683 | A * | 2/1948 | Wood, Jr. | 290/52 |
| 3,750,001 | A * | 7/1973 | McCloskey | 322/35 |
| 4,122,381 | A * | 10/1978 | Sturm | 320/128 |
| 4,246,753 | A * | 1/1981 | Redmond | 60/398 |
| 4,352,025 | A * | 9/1982 | Troyen | 290/54 |
| 4,387,575 | A * | 6/1983 | Wenzel | 60/648 |
| 4,439,687 | A * | 3/1984 | Wood et al. | 290/40 R |
| 4,488,055 | A * | 12/1984 | Toyama | 290/53 |
| 4,496,845 | A * | 1/1985 | Ensign et al. | 290/43 |
| 4,555,637 | A * | 11/1985 | Irvine | 290/52 |
| 4,731,545 | A * | 3/1988 | Lerner et al. | 290/54 |
| 4,740,711 | A * | 4/1988 | Sato et al. | 290/52 |
| 5,043,592 | A * | 8/1991 | Hochstrasser | 290/52 |
| 6,509,652 | B2 * | 1/2003 | Yumita | 290/54 |
| 6,824,347 | B2 * | 11/2004 | Maloney | 415/1 |
| 7,357,599 | B2 * | 4/2008 | Cripps | 405/75 |
| 2007/0182159 | A1 * | 8/2007 | Davis | 290/54 |
| 2008/0217923 | A1 * | 9/2008 | Yen | 290/54 |

FOREIGN PATENT DOCUMENTS

| | | | |
|---|---|---|---|
| JP | 55137371 A | * | 10/1980 |
| JP | 2002242811 A | * | 8/2002 |
| JP | 2003139039 A | * | 5/2003 |
| JP | 2006118405 A | * | 5/2006 |

\* cited by examiner

*Primary Examiner*—Joseph Waks
(74) *Attorney, Agent, or Firm*—Stetina Brunda Garred & Brucker

(57) ABSTRACT

There is provided a power generation and distribution system for use in combination with a utility conduit having fluid passing therethrough. The power generation and distribution system includes a rotation element disposable within the utility conduit. The rotation element rotates in response to fluid passing within the utility conduit. A power generator is in mechanical communication with the rotation element, and generates power in response to rotation of the rotation element. This system also includes a power distributor in electrical communication with the power generator and electrically connectable to a power outlet to distribute power thereto.

23 Claims, 3 Drawing Sheets

FLOW GENERATOR FOR USE IN CONNECTION WITH A UTILITY CONDUIT

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Field of the Invention

The present invention relates generally to an energy production system and more particularly, to a power generation and distribution system for use in combination with a utility conduit having fluid passing therethrough.

2. Description of the Related Art

One of the more important issues currently affecting the global community is energy generation and management. There are concerns that traditional energy sources may not be able to support the energy needs of the world's growing population. For instance, rolling blackouts are already common occurrences in heavily populated areas. Furthermore, limited natural resources such as oil and coal, which have been sources of energy for many years, may be depleted before too long. The diminishing supply of these natural resources also makes energy more expensive, as evidenced by the rising cost of oil.

In addition, traditional energy sources tend to be undesirable because of their negative impact on the environment. For instance, the burning of coal produces harmful emissions which may cause damage the ozone layer. The harmful emissions may also create human health problems, such as respiratory and allergy conditions.

As such, given that traditional energy sources may be limited and that they may have negative environmental impact, the art recognizes that alternate energy sources may be needed to replenish or supplement traditional energy sources. It may be desirable for an alternate energy source to provide energy in an efficient and environmentally friendly manner. It may further be desirable to provide energy without consuming valuable natural resources.

In recent years, various energy solutions have been developed which produce energy without consuming valuable resources. In other words, they harness energy that exists in one form and convert it into a consumable form of energy in an efficient and environmentally friendly manner. Exemplary energy solutions include, but are not limited to, solar power sources and wind-generated power sources. With regard to solar powered energy sources, energy emitted by the sun is captured and converted into energy that may be used by homes and businesses. Wind-generated power typically employs a plurality of windmills which rotate in the wind. Each windmill is typically coupled to a turbine, which generates energy in response to rotation of the windmill.

In order for solar and wind generated power sources to be viable energy source alternatives, they are generally employed in areas where sun and wind are prevalent. Other areas which are deprived from abundant sun and wind may not be suited for solar and wind generated power alternatives. As such, these areas may be forced to rely on undesirable traditional energy generation methods.

As is apparent from the foregoing, there exists a need in the art for an efficient and environmentally friendly energy alternative that may be employed in communities around the world. The present invention addresses this particular need, as will be described in more detail below.

BRIEF SUMMARY

There is provided a power generation and distribution system for use in combination with a utility conduit having fluid passing therethrough. The power generation and distribution system includes a rotation element disposable within the utility conduit. The rotation element rotates in response to fluid passing within the utility conduit. A power generator is in mechanical communication with the rotation element, and generates power in response to rotation of the rotation element. This system also includes a power distributor in electrical communication with the power generator and electrically connectable to a power outlet to distribute power thereto.

It is contemplated that the power generation and distribution system may provide a safe and efficient source of energy without consuming valuable natural resources. The power generation and distribution system may also provide energy without producing emissions which may harm the environment. Rather, the system captures the energy of a fluid passing through a utility conduit and converts that energy into an energy form that may be used by homes and businesses.

The power generation and distribution system may further include a power generation management circuit in electrical communication with the power generator. The power generation management circuit is operative to log the amount of power generated by the power generator. The system may also include a power distribution management circuit in electrical communication with the power distributor. The power distribution management circuit is operative to log the amount of power distributed by the power distributor.

It is also contemplated that aspects of the present invention also include a power generation and distribution network for use in combination with a utility conduit having fluid passing therethrough. The network includes a plurality of power generator assemblies, each including a rotation element and a power generator as described above. A power distributor is in electrical communication with the plurality of power generator assemblies and electrically connectable to a plurality of power outlets to distribute power thereto.

The power generator and distribution network may include a power generation management circuit and a power distribution management circuit as described above. The power generation management circuit may be capable of logging the amount of power generated by each power generator assembly. Similarly, the power distribution management circuit may be capable of logging the amount of power distributed by the power distributor to each power outlet. Furthermore, the power distributor of the power generation and distribution network may include a power storage unit to store power received from the plurality of power generator assemblies.

The present invention is best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings in which like numbers refer to like parts throughout and in which.

DETAILED DESCRIPTION

Figure 1:
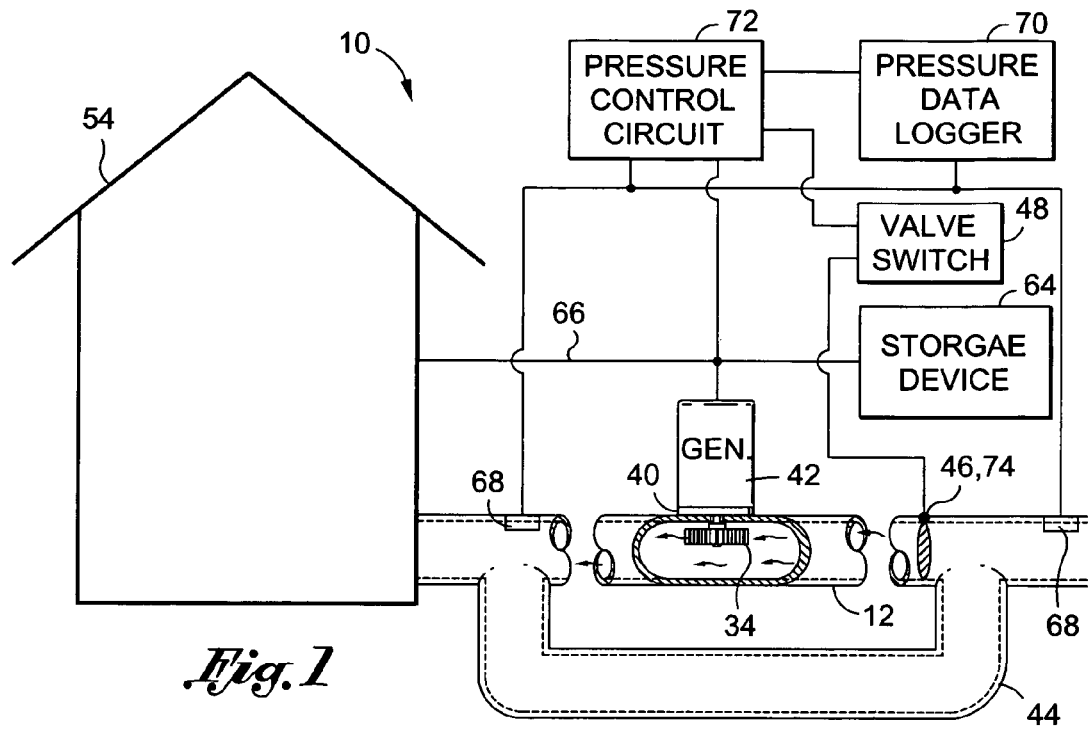
FIG. 1 is a schematic diagram of an embodiment of a power generation and distribution system having a rotation element and a power generator, the rotation element being disposed within a utility conduit.

Referring now to the drawings wherein the showings are for purposes of illustrating a preferred embodiment of the present invention only, and not for purposes of limiting the same, there is shown a power generation and distribution system 10 constructed in accordance with an embodiment of the present invention. It is contemplated that various aspects of the present invention are directed toward an energy solution that may be used in connection with a utility conduit to provide an inexpensive alternative or supplemental energy source. In addition, other aspects of the present invention are directed toward mitigating pressure loss within the utility conduit 12. Furthermore, as set forth below, the power generation and distribution system 10 may provide energy without consuming valuable natural resources or producing environmentally harmful emissions.

Referring now specifically to FIG. 1, there is shown a particular embodiment of the power generation and distribution system 10 of the present invention. As illustrated, the system 10 is used in combination with a utility conduit 12 having fluid passing therethrough. It is understood that utility conduits 12 are commonly employed in the construction of various structures including residential homes and commercial buildings. Exemplary utility conduits 12 may include, but are not limited to, plumbing for water and gas, duct work for heating and air conditioning, and plumbing for a pool or other water feature. In this regard, it is understood that the utility conduit 12 may be used to transfer a liquid, gas, or combinations thereof.

It may be desirable for the utility conduit 12 to be constructed of a non conductive material to mitigate transmission of an electric charge therealong. Such non conductive materials may include Acrylonitrile Butadiene Styrene (ABS), Polyvinyl Chloride (PVC), and other non conductive materials known by those skilled in the art. The utility conduit 12 includes a conduit wall 14 defining a wall inner surface 16 and a wall outer surface 18. The wall inner surface 16 defines a conduit opening 20 through which fluid may be communicated. The conduit 12 also defines a conduit longitudinal axis 24 along which the fluid is communicated.

Figure 2A:
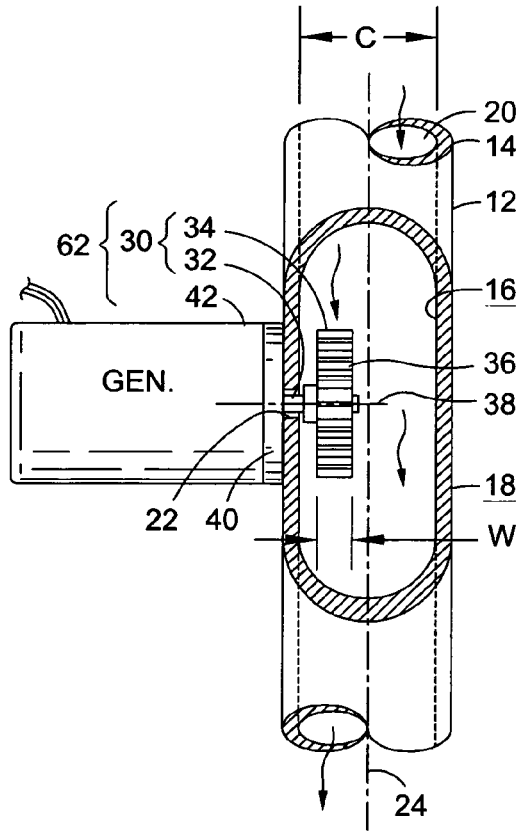
FIG. 2A is a cutaway view of a power generator assembly including a rotation element disposed within a utility conduit, the rotation element being connected to a power generator, the rotation element defining a rectangular longitudinal cross-section.
Figure 2B:
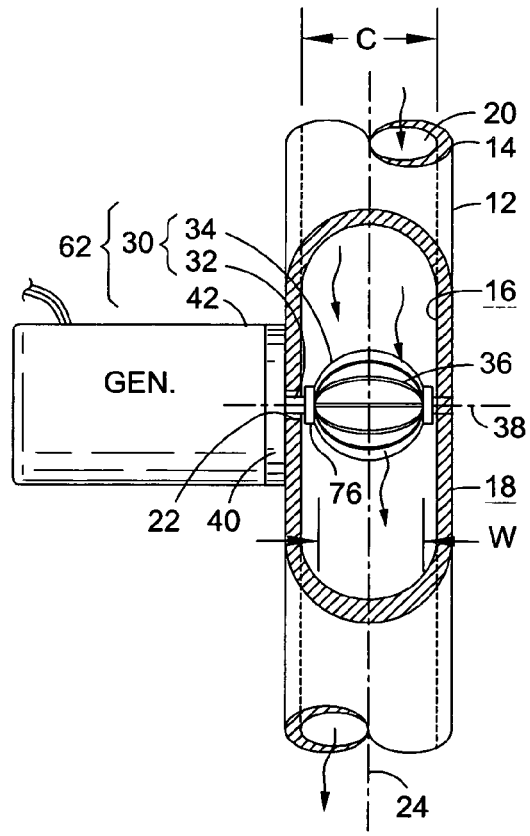
FIG. 2B is a cutaway view of a power generator assembly having a rotation element defining a generally circular longitudinal cross-section.

The power generation and distribution system 10 further includes a rotation element 30 disposed within the utility conduit 12. The rotation element 30 is configured to rotate in response to fluid passing within the utility conduit 12. As best illustrated in FIGS. 2A and 2B, the rotation element 30 includes a rotation rod 32 and a rotation wheel 34 connected to the rotation rod 32. The rotation rod 32 extends through a conduit aperture 22 formed within the conduit wall 14. The rotation rod 32 defines a rotation axis 38 about which the rotation wheel 34 rotates. In the embodiment depicted in FIGS. 2A and 2B, the rotation axis 38 is orthogonal to the conduit longitudinal axis 24; however, it is understood that the rotation axis 38 may be angularly disposed relative to the conduit longitudinal axis 24 at angles other than orthogonal without departing from the spirit and scope of the present invention.

It is contemplated that the rotation wheel 34 may define a wide range of shapes and sizes. Referring now to FIGS. 2A and 2B, the rotation wheel 34 defines a rotation wheel width "W" and the conduit 12 defines a conduit width "C." The rotation wheel width W of the rotation wheel 34 shown in FIG. 2A is smaller than the rotation wheel width W of the rotation wheel 34 shown in FIG. 2B. In particular, the rotation wheel 34 shown in FIG. 2B extends across most of the conduit width C. In contrast, the rotation wheel 34 depicted in FIG. 2A is considerably smaller than the conduit width C. It may be desirable to vary the rotation wheel width W relative to the conduit width C depending on a wide range of factors, such as the anticipated velocity of the fluid flow through the utility conduit 12, the rotational friction created by rotation of the rotation element 30, and the viscosity of the fluid flowing through the utility conduit 12. A rotation wheel 34 having a larger rotation wheel width W impedes the flow more than a rotation wheel 34 having a smaller rotation wheel width W.

In addition to having different rotation wheel widths W, the rotation wheels 34 depicted in FIGS. 2A and 2B also vary in relation to their shape. More specifically, the rotation wheel 34 shown in FIG. 2A defines a substantially rectangular longitudinal cross-section, whereas the rotation wheel 34 depicted in FIG. 2B defines a substantially circular longitudinal cross-section. Although the rotation wheels 34 shown in FIGS. 2A and 2B define rectangular and circular cross-sections, it is understood that the rotation wheel 34 may also define various other shapes without departing from the scope of the present invention.

According to one embodiment of the invention, the rotation wheel 34 further includes structural attributes intended to enhance the rotation thereof in response to fluid passing within the utility conduit 12. In the particular implementation shown in FIGS. 2A and 2B, the rotation wheel 34 includes a plurality of ribs 36 and grooves disposed about an outer periphery of the rotation wheel 34. The grooved outer periphery of the rotation wheel 34 increases the drag of the rotation wheel 34 in relation to the fluid passing within the utility conduit 12, thereby biasing the rotation wheel 34 in a direction of rotation.

The rotation element 30 is mechanically connected to a power generator 42 which generates power in response to rotation of the rotation element 30. As depicted in the drawings, the power generator 42 is disposed on the outside of the utility conduit 12. In the particular embodiment depicted in FIGS. 2A and 2B, the rotation rod 32 extends between the rotation wheel 34 and the power generator 42. Accordingly to one embodiment, the power generator 42 includes an armature connected to the rotation rod. The armature may be concentrically disposed within a series of conductor windings. The armature and conductor windings are contained within a generator housing. As the armature rotates within the conductor windings, electrical power is generated. Those of ordinary skill in the art will recognize that the armature and conductor windings are exemplary components of a power generator 42 and that power generators 42 having other components may be used in connection with various embodiments of the present invention.

One aspect of the present invention includes a seal 40 disposed about the conduit aperture 22 to mitigate the loss of fluid from within the utility conduit 12 via the conduit aperture 22. As illustrated in FIG. 1, the seal 40 is disposed adjacent the wall outer surface 18 of the utility conduit 12. However, in other embodiments, the seal 40 may be disposed adjacent the wall inner surface 16 of the utility conduit 12. The seal 40 is also disposed about the rotation rod 32 and is configured to allow the rotation rod 32 to rotate as the rotation wheel 34 rotates.

It is contemplated that various implementations of the present invention may decrease the downstream pressure of the fluid passing through the utility conduit 12. As the rotational resistance of the power generator 42 increases, the downstream pressure of the fluid passing through the utility conduit 12 decreases. More specifically, the rotational resistance of the rotation element 30 may create a pressure differential between the upstream and downstream pressure. The loss of fluid pressure within the utility conduit 12 may be undesirable. For instance, the utility conduit 12 may be delivering water to a shower where high water pressure may be desired. Alternatively, the utility conduit 12 may be delivering water to a hose for washing a vehicle, wherein high water pressure would also be desired. Furthermore, a large pressure differential between the upstream and downstream pressures may damage the utility conduit 12, or various components within the power generation and distribution system. As such, various aspects of the invention are directed toward providing a power generation and distribution system 10 while also giving the user the ability to regulate pressure loss within the utility conduit 12 that may be caused by the power generator 42.

A loss in pressure may be caused by friction within the power generator 42. Therefore, one aspect of the invention is directed toward disengaging the rotation wheel 34 from the power generator 42 to mitigate pressure loss within the utility conduit 12. In one embodiment, a clutch 76 is disposed between the rotation wheel 34 and the rotation rod 32 to enable detachable engagement between the rotation wheel 34 and the rotation rod 32. If a user desires a higher downstream fluid pressure, then the rotation wheel 34 may be disengaged from the rotation rod 32. In this manner, the rotation wheel 34 may freely rotate within the utility conduit 12 without having to overcome the rotational resistance of the power generator 42. Conventional clutches known by those skilled in the art may be used in connection with various embodiments of the invention. For a more detailed description of a clutch 76, please refer to U.S. Pat. No. 4,474,275 issued to Steadeli, entitled Automatically Engageable Jaw Clutch, the contents of which are expressly incorporated herein by reference.

In another embodiment, the power generator 42 may be controlled to regulate the pressure loss associated with the generator to maintain a desired pressure level downstream of the generator. More particularly, rotational resistance (reluctance) and output current may be varied by varying the voltage applied to the windings of the power generator 42. Therefore, one implementation of the invention includes a pressure differential regulating switch 48 for varying the rotational resistance of a power generator 42 employing electro-magnets for creating rotational resistance. The pressure differential regulating switch 48 may allow complete shut-off or incremental variation of the electricity supplied to the electromagnets.

In another embodiment of the invention, the loss of pressure may be avoided or regulated by re-routing some ore all of the fluid to avoid the rotation element 30. In this manner, a secondary flow path 44 may be employed to transfer fluid from a point upstream of the rotation element 30 to a point downstream of the rotation element 30. A pressure control valve 46 may be connected between the secondary flow path 44 and the utility conduit 12 to control the passage of fluid therebetween. A valve switch 48 may be connected to the pressure control valve 46 to enable a user to regulate the opening and closing of the same, e.g. in response to sensed pressure or pressure differential within the conduit.

Given that the rotation element 30 may regulate the fluid pressure within the utility conduit 12, it may be desirable to measure the fluid pressure. Accordingly, another aspect of the invention includes a pressure sensor 68 in fluid communication with the utility conduit 12 to measure the fluid pressure within the utility conduit 12. In this manner, a single pressure sensor 68 may be disposed downstream of the rotation element 30 to measure the downstream pressure of the fluid. Furthermore, a pressure sensor 68 may also be included upstream of the rotation element 30 to measure the change in fluid pressure as fluid passes the rotation element 30. The pressure differential may be useful to diagnose the operational conditions of the system 10 and the utility conduit 12. In addition, the pressure sensor 68 may be used to help maintain a minimum fluid pressure within the conduit 12 downstream of the rotation element 30.

The pressure sensors 68 may generate pressure data which may be stored in a pressure data logger 70. In this manner, the pressure data logger 70 may be electrically connected to the pressure sensors 68. A pressure control circuit 72 may analyze the pressure control data to control the downstream pressure of the fluid within the utility conduit 12. The pressure control circuit 72 may be configured to generate a pressure control signal to a pressure control circuit 74 (e.g., clutch or control valve) to decrease the rotational resistance of the rotation element 30, as described above.

It may also be desirable to enable drainage of the utility conduit 12. For instance, if the fluid within the utility conduit 12 is susceptible to freezing, the structural integrity of the utility conduit 12 may be compromised if the fluid freezes and expands. Therefore, one embodiment of the present invention includes a conduit drain to enable drainage of the fluid within the utility conduit 12.

In another embodiment of the invention, the utility conduit 12 may be drained by reversing the flow of fluid within the utility conduit 12. In this manner, fluid may exit the utility conduit through the typical utility conduit input. According to one embodiment, a drainage pump may be fluidly connected to the utility conduit 12 to reverse the flow of fluid for purposes of draining the utility conduit 12.

As power is generated by the power generator 42, it may be distributed to various power outlets 54. As such, various aspects of the present invention are directed toward a power distributor 52 configured to distribute the generated power. The power distributor 52 is in electrical communication with the power generator 42 to receive power therefrom. The power distributor 52 is also electrical connectable with a power outlet 54 to communicate power thereto. In particular, the power distributor 52 may be configured to enable several power outlets 42 to be plugged into the power distributor 52 to receive power therefrom.

The power outlet 54 may vary according to various aspects of the present invention. For instance, the power outlet 54 may include the main power line leading to a house, or other residential or commercial structure. The power outlet 54 may also include a particular appliance associated with a residential or commercial structure. Other embodiments of the power outlet 54 may include an auxiliary power generator which may be used as an auxiliary power supply. The power outlet

54 may additionally include a conventional power outlet which may be connectable to electrical equipment. It is understood that the previous examples of the power outlet 54 are exemplary in nature, and are not intended to be limiting, in that other power outlets 54 known by those skilled in the art may also be employed without departing from the spirit and scope of the present invention.

Another aspect of the invention relates to the management of the power generated and distributed by the system 10. To this end, various embodiments of the invention include a power generation management circuit 56 in electrical communication with the power generator 42. The power generation management circuit 56 is operative to log the amount of power generated by the power generator 42. Therefore, as the power generator 42 generates power, the power generation management circuit 56 records the quantity of power generated.

Each power generator 42 may be assigned a specific power generator address. As power is generated by a particular power generator 42 the power generation management circuit 56 will credit that particular power generator 42 with the amount of power it generated. In this manner, a log may be kept of the amount of power generated by a specific power generator 42.

Once power is generated, it is distributed to one or more power outlets 54. Therefore, other embodiments of the invention include a power distribution management circuit 58 in electrical communication with the power distributor 52 for logging the amount of power distributed by the power distributor 52. It is contemplated that the power distributor 52 may distribute power to a plurality of power outlets 54. As such, the power distribution management circuit 58 may log the amount of power distributed to each power outlet 42.

In one particular embodiment, each power outlet 54 is assigned a power outlet address. As power is distributed from the power distributor 52 to a respective power outlet 54, the corresponding power outlet address is charged for the amount of power distributed thereto.

The power generation management circuit 56 and power distribution management circuit 58 may be desirable in embodiments in which the power generated by the power generation and distribution system 10 is sold. The power circuits 56, 58 facilitate an accounting of the power that is generated and sold by a particular power generation and distribution system 10.

Along these lines, it may be desirable to generate power on a larger scale. Therefore, referring now to FIG. 3, another aspect of the present invention includes a power generation and distribution network 60 having a plurality of power generators assemblies 62 contributing to the overall energy produced by the energy infrastructure. Each power generator assembly 62 includes a rotation element 30 and a power generator 42 as described in more detail above.

Figure 3:
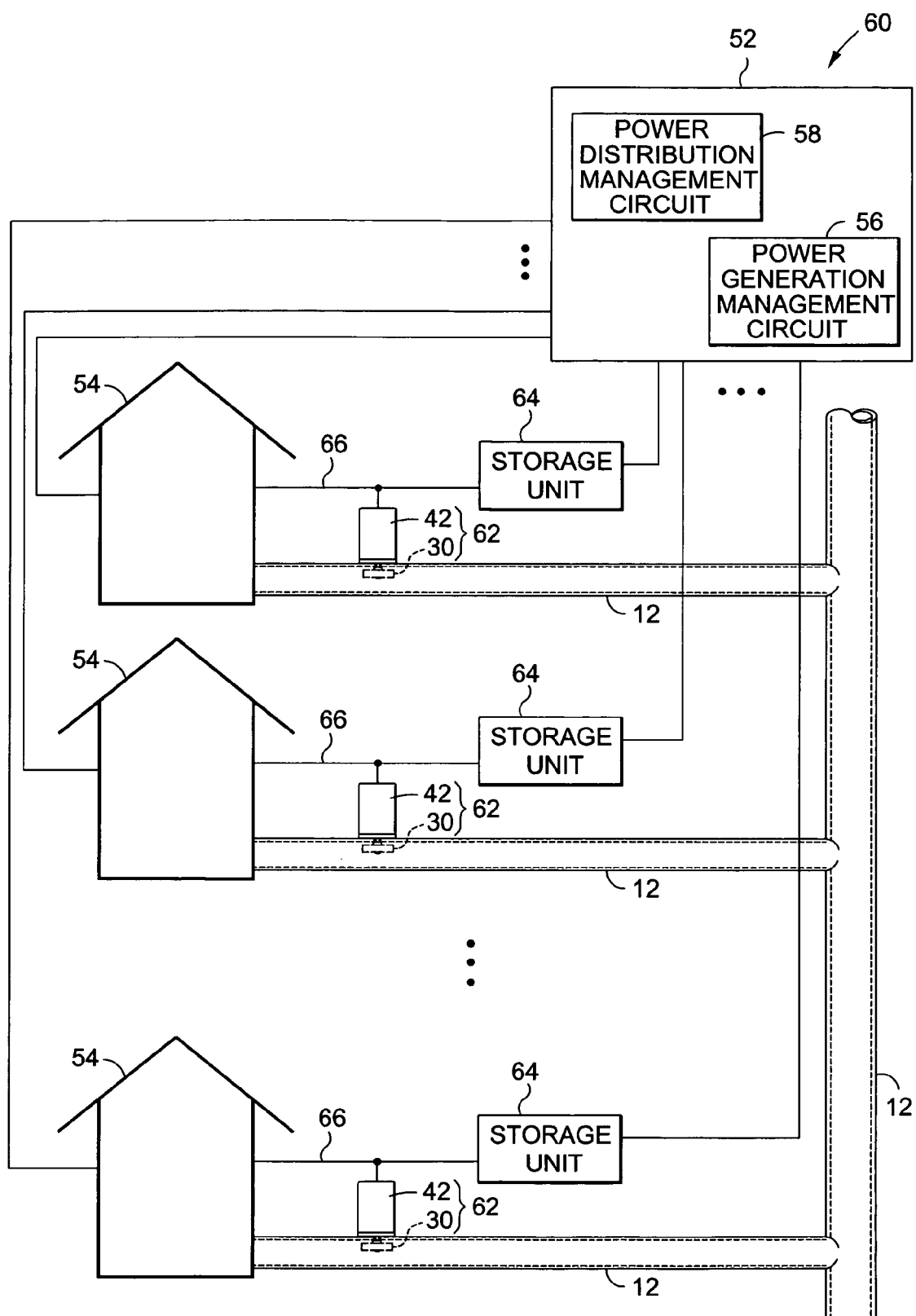
FIG. 3 is a schematic diagram of a power generation and distribution network having a plurality of power generator assemblies connected to a central power distributor.
Figure 4:
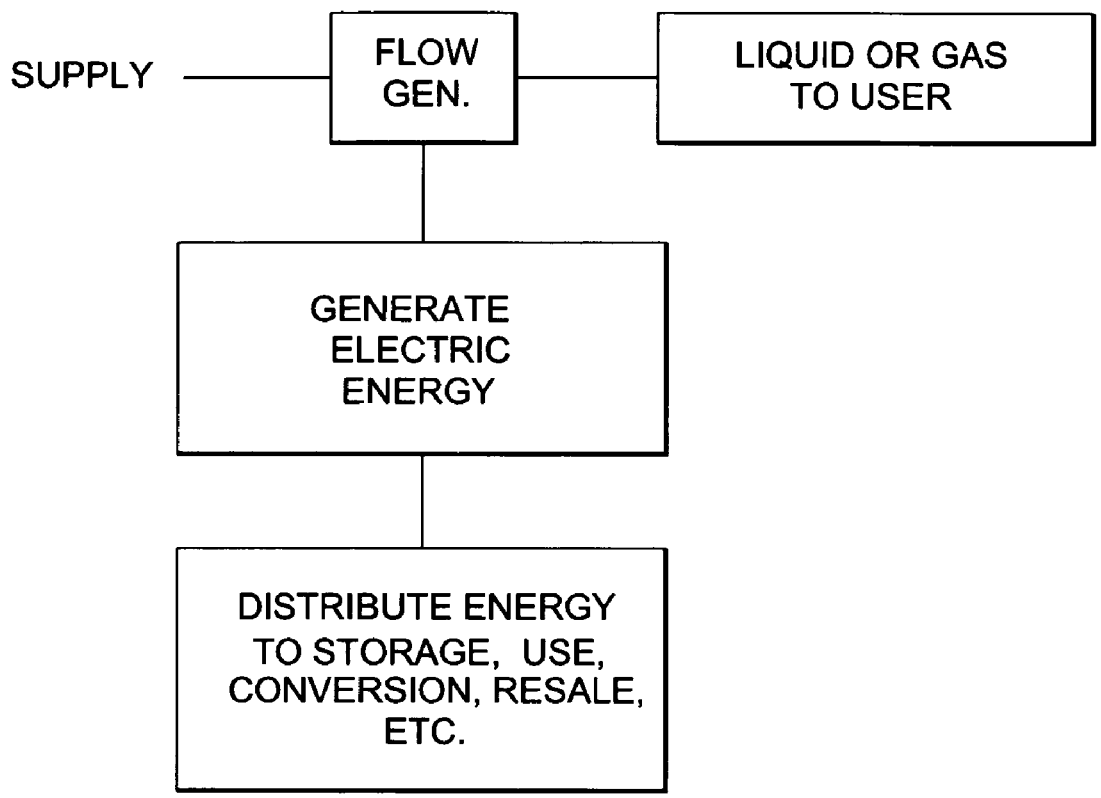
FIG. 4 is a flow chart describing the generation of power according to an aspect of the present invention.

The power generation and distribution network 60 further includes a power distributor 52. As shown in FIG. 3, the power distributor 52 is in electrical communication with a plurality of power generator assemblies 62. In this manner, a single power distributor 52 may be connected to a plurality of power generator assemblies 62 to receive power from each assembly 62. As the number of power generator assemblies 62 increases, more power distributors 52 may also be needed to accommodate the amount of power that is collectively generated.

As shown, a storage unit 64 is disposed between the power assembly 62 and the power distributor 52. The storage unit 64 may store power generated by the local power generator assembly 62 before it is distributed by the power distributor 52. However, it is understood that the power generator assembly 62 may be directly connected to the power distributor 52. In this regard, a central storage unit 64 may be connected to several power generator assemblies 62.

The power distributor 52 receives power from the power generator assemblies 62 and distributes the power to a plurality of power outlets 54. In this manner, the power distributor 52 may supply power to a plurality of residential or commercial structures, or other power outlets 54 as described in more detail above. In the embodiment shown in FIG. 3, each power outlet 54 is a residential structure having a respective power generator assembly 62 connected thereto. However, it is understood that power may be communicated to a power outlet 54 that is not connected to a power generator assembly 62.

When multiple power generator assemblies 62 are generating power and multiple power outlets 54 are receiving power, it may be desirable to account for the power generated by each power generator assembly 62 and the amount of power consumed by each power outlet 54. In this manner, the power generator assemblies 62 may be in electrical communication with a power generation management circuit 56 to log the amount of power generated by each power generator assembly 62. Furthermore, a power distribution management circuit 58 may be in electrical communication with the power distributor 52 to log the amount of power distributed by the power distributor 52. According to one aspect of the invention, the power distribution management circuit 58 is capable of logging the amount of power distributed to each power outlet 54. In other words, the power distribution management circuit 58 may be capable of more than merely recording the amount of overall power distributed by a particular power distributor 52. Rather, the power distribution management circuit 58 may account for the power distributed to each power outlet 54.

As shown in FIG. 3, there is shown three residential structures, each having a utility conduit 12 connected thereto. Each utility conduit 12 branches off from a main utility line 11. Each utility conduit 12 has a power generator assembly 62 connected thereto as described above. As shown, the power generator assembly 62 is connected to a portion of the utility conduit 12 that is external to that residential structure; however, it is understood that the power generator assembly 62 may be connected to a utility conduit 12 that is internal to the residential structure. A power line 66 extends between each power generator assembly 62 and a respective residential structure. In this manner, power may be communicated directly from the power generator assembly 62 and the residential structure or other power outlet 54.

Each power generator assembly 62 is also in electrical communication with a central power distributor 52. In this manner, the power generated by the power generator assembly 62 may be communicated to the central power distributor 52. Power may then be distributed from the central power distributor 52 to the various power outlets 54 as needed. Although FIG. 3 shows three power outlets 54 each having a corresponding power generator assembly 62, it is understood that power may be distributed from the central power distributor 52 to a power outlet 54 that does not have a corresponding power generator assembly 62. As described above, the central power distributor 52 may include a power generation management circuit 56 and a power distribution management circuit 58 to account for the power generated by each power generator assembly 62 and the amount of power used by each power outlet 54. Therefore, the owner of each power generator assembly 62 may sell power to the central power distributor 52 or can receive a credit if the owner receives power from the central power distributor 52.

It is contemplated that the power generator assembly 62 may be installed on new utility conduits 12 or existing utility conduits 12. In general, a utility conduit 12 includes several utility conduit elements which collectively form utility conduit 12. In many cases, each utility conduit element includes a piece of hollow tubing that is fitted between adjacent pieces of hollow tubing. Therefore, with regard to installing the power generator assembly 62 on new utility conduits 12, it may be desirable to connect the power generator assembly near an opening of one the utility conduit elements to facilitate insertion of the rotation wheel 34 into the utility conduit 12 and connection with the rotation rod 32. With regard to existing utility conduits 12, a utility conduit element may have to be removed form the utility conduit 12 to allow the rotation wheel 34 to be inserted therein. Once the power generator assembly 62 is connected with the utility conduit element, the utility conduit element may be returned back to the utility conduit 12.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A power generation and distribution system for use in combination with a utility conduit having fluid passing therethrough, the power generation and distribution system comprising:
   a rotation element disposable within the utility conduit, the rotation element being rotatable in response to fluid passing within the utility conduit;
   a power generator in mechanical communication with the rotation element, the power generator generating power in response to rotation of the rotation element;
   a power distributor in electrical communication with the power generator and electrically connectable to a power outlet to distribute power thereto; and
   a pressure control circuit being operative to regulate fluid pressure within the utility conduit;
   wherein the pressure control circuit is in operable communication with the rotation element, and the rotation element is detachably engageable to the power generator, the pressure control circuit being operative to regulate fluid pressure within the utility conduit.

2. The power generation and distribution system of claim 1 further includes a power generation management circuit in electrical communication with the power generator, the power generation management circuit being operative to log the amount of power generated by the power generator.

3. The power generation and distribution system of claim 1 further includes a power distribution management circuit in electrical communication with the power distributor, the power distribution management circuit being operative to log the amount of power distributed by the power distributor.

4. The power generation and distribution system of claim 1 wherein the utility conduit defines a conduit longitudinal axis and a conduit opening having an opening cross sectional area orthogonal to the conduit longitudinal axis, the rotation element being disposable within the opening cross sectional area.

5. The power generation and distribution system of claim 1 wherein the utility conduit defines a conduit longitudinal axis and the rotation element is rotatable about a rotation axis, the rotation element disposed within the utility conduit with the rotation axis being orthogonally relative to the conduit longitudinal axis.

6. The power generation and distribution system of claim 1 wherein the rotation element includes a rotation wheel and a rotation rod.

7. The power generation and distribution system of claim 6 wherein the rotation wheel is detachably connected to the rotation rod.

8. The power generation and distribution system of claim 1 further comprising a pressure sensor in fluid communication with the utility conduit to generate pressure data in response to the fluid pressure within the utility conduit.

9. The power generation and distribution system of claim 8 wherein the pressure sensor is downstream of the rotation element.

10. The power generation and distribution system of claim 8 wherein the pressure control circuit is in electrical communication with the pressure sensor, the pressure control circuit being operative to disengage the rotation element from the power generator in response to received pressure data from the pressure sensor.

11. The power generation and distribution system of claim 10 wherein the pressure control circuit is programmable to establish a minimum pressure at which the rotation element disengages from the power generator.

12. The power generation and distribution system of claim 1 further comprising a secondary flow path in fluid communication with the utility conduit, the secondary flow path having a flow input upstream of the rotation element and a flow output downstream of the rotation element.

13. The power generation and distribution system of claim 12 further comprising a pressure control valve in fluid communication with the utility conduit to control the flow of fluid between the utility conduit and the secondary flow path.

14. A power generation and distribution system for use in combination with a utility conduit having fluid passing therethrough, the power generation and distribution system comprising:
    a rotation element disposable within the utility conduit, the rotation element being rotatable in response to fluid passing within the utility conduit;
    a power generator in mechanical communication with the rotation element, the power generator generating power in response to rotation of the rotation element;
    a power distributor in electrical communication with the power generator and electrically connectable to a power outlet to distribute power thereto; and
    a pressure control circuit being operative to regulate fluid pressure within the utility conduit;
    wherein the pressure control circuit is in electrical communication with the power generator, rotational resistance within the power generator being created by magnetic reluctance associated with the power generator, the pressure control circuit being operative to regulate the reluctance within the power generator.

15. The power generation and distribution system of claim 14 further comprising a pressure sensor in fluid communication with the utility conduit to generate pressure data related to the fluid pressure within the utility conduit, the pressure control circuit being operative to regulate the magnetic reluctance within the power generator in response to received pressure data from the pressure sensor.

16. A power generation and distribution network for use in combination with a utility conduit having fluid passing therethrough, the power generation and distribution system comprising:
- a plurality of power generator assemblies, each power generator assembly including:
  - a rotation element disposable within the utility conduit, the rotation element rotating in response to fluid passing within the utility conduit; and
  - a power generator in mechanical communication with the rotation element, the power generator generating power in response to rotation of the rotation element;
  - a pressure sensor in fluid communication with the utility conduit to generate pressure data related to the fluid pressure within the utility conduit;
  - a pressure control circuit in electrical communication with the pressure sensor, the pressure control circuit being operative to regulate fluid pressure within the utility conduit in response to received pressure data;
  - wherein the pressure control circuit is in operable communication with the rotation element, and the rotation element is detachably engageable to the power generator, the pressure control circuit being operative to regulate fluid pressure within the utility conduit by selectively disengaging the rotation element from the power generator; and
- a power distributor in electrical communication with the plurality of power generator assemblies and electrically connectable to a plurality of power outlets to distribute power thereto.

17. The power generation and distribution network as recited in claim 16 wherein the power distributor includes a power storage unit to store power received from the plurality of power generator assemblies.

18. The power generation and distribution network of claim 16 further comprising a power generation management circuit in electrical communication with the plurality of power generators assemblies, the power generation management circuit being operative to log the amount of power generated by the plurality of power generator assemblies.

19. The power generation and distribution network of claim 18 wherein the power generation management circuit is capable of logging the amount of power generated by each power generator assembly.

20. The power generation and distribution network of claim 16 further comprising a power distribution management circuit in electrical communication with the power distributor, the power distribution management circuit being operative to log the amount of power distributed by the power distributor.

21. The power generation and distribution system of claim 16 further comprising a secondary flow path in fluid communication with the utility conduit, the secondary flow path having a flow input upstream of the rotation element and a flow output downstream of the rotation element.

22. The power generation and distribution system of claim 21 further comprising a pressure control valve in fluid communication with the utility conduit to control the flow of fluid between the utility conduit and the secondary flow path.

23. A power generation and distribution network for use in combination with a utility conduit having fluid passing therethrough, the power generation and distribution system comprising:
- a plurality of power generator assemblies, each power generator assembly including:
  - a rotation element disposable within the utility conduit, the rotation element rotating in response to fluid passing within the utility conduit; and
  - a power generator in mechanical communication with the rotation element, the power generator generating power in response to rotation of the rotation element;
  - a pressure sensor in fluid communication with the utility conduit to generate pressure data related to the fluid pressure within the utility conduit;
  - a pressure control circuit in electrical communication with the pressure sensor, the pressure control circuit being operative to regulate fluid pressure within the utility conduit in response to received pressure data;
  - wherein the pressure control circuit is in electrical communication with the power generator, rotational resistance within the power generator being created by magnetic reluctance associated with the power generator, the pressure control circuit being operative to regulate the reluctance within the power generator; and
- a power distributor in electrical communication with the plurality of power generator assemblies and electrically connectable to a plurality of power outlets to distribute power thereto.

* * * * *